United States Patent
Hestetun (10) Patent No.: US 12,529,440 B2
(45) Date of Patent: Jan. 20, 2026

(54) CONFIGURABLE BLOCK MANIFOLD SYSTEM

(71) Applicant: VETCO GRAY SCANDINAVIA AS, Nailsea (GB)

(72) Inventor: Steinar Lindemann Hestetun, Akershus (NO)

(73) Assignee: VETCO GRAY SCANDINAVIA AS, Stavanger (NO)

( * ) Notice: Subject to any disclaimer, the term of this patent is extended or adjusted under 35 U.S.C. 154(b) by 59 days.

(21) Appl. No.: 17/753,769

(22) PCT Filed: Sep. 18, 2020

(86) PCT No.: PCT/EP2020/025421
§ 371 (c)(1),
(2) Date: Mar. 14, 2022

(87) PCT Pub. No.: WO2021/052632
PCT Pub. Date: Mar. 25, 2021

(65) Prior Publication Data
US 2022/0373120 A1    Nov. 24, 2022

(30) Foreign Application Priority Data

Sep. 19, 2019  (NO) ................................. 20191136

(51) Int. Cl.
*F16L 41/03* (2006.01)
*E21B 43/01* (2006.01)
(Continued)

(52) U.S. Cl.
CPC .......... *F16L 41/03* (2013.01); *E21B 43/0107* (2013.01); *E21B 43/017* (2013.01);
(Continued)

(58) Field of Classification Search
CPC ............... E21B 43/2607; E21B 43/017; E21B 43/0175; E21B 43/0107; E21B 33/068;
(Continued)

(56) References Cited

U.S. PATENT DOCUMENTS 4,874,008 A    10/1989  Lawson
2002/0134445 A1    9/2002  Eidsmore
(Continued)

FOREIGN PATENT DOCUMENTS

WO    2016/044910 A1    3/2016
WO    2019/063311 A1    4/2019

*Primary Examiner* — Atif H Chaudry
(74) *Attorney, Agent, or Firm* — Hogan Lovells US LLP (57) ABSTRACT

The present invention relates to a header configuration block for a hydrocarbon well comprising a header configuration block housing having a plurality of transversal bores each in fluid connection with a discrete longitudinal main bore. At least one cut off valve is located in each transversal bore. A first connecting surface is parallel to and similar with a second connecting surface, whereby the first connecting surface and the second connecting surface are adapted to be connected to at least one further similar header configuration block. The invention also relates to a manifold branch configuration block and a well fluid manifold assembled of header configuration blocks, branch configuration blocks and flow line configuration blocks.

10 Claims, 9 Drawing Sheets

(51) Int. Cl.
  *E21B 43/017* (2006.01)
  *E21B 43/26* (2006.01)
  *F15B 13/08* (2006.01)
  *F16K 27/00* (2006.01)

(52) U.S. Cl.
  CPC ...... *E21B 43/0175* (2020.05); *E21B 43/2607* (2020.05); *F15B 13/0814* (2013.01); *F15B 13/0817* (2013.01); *F16K 27/003* (2013.01)

(58) Field of Classification Search
  CPC ........ E21B 33/076; E21B 43/12; F16L 41/03; F15B 13/0814; F15B 13/0817
  See application file for complete search history.

(56) References Cited

U.S. PATENT DOCUMENTS

| | | |
|---|---|---|
| 2012/0181015 A1 | 7/2012 | Kajaria |
| 2014/0064855 A1 | 3/2014 | Hammer |
| 2015/0000766 A1* | 1/2015 | Arizpe .................. E21B 43/26 137/561 A |
| 2018/0030796 A1 | 2/2018 | Kalia |
| 2018/0187507 A1 | 7/2018 | Hill |
| 2018/0187522 A1* | 7/2018 | Ceccon De Azevedo .................. E21B 34/04 |

* cited by examiner

CONFIGURABLE BLOCK MANIFOLD SYSTEM

TECHNICAL FIELD

The present invention relates to a configurable block manifold system based on three types standardized manifold building blocks.

The three types of standardized manifold building blocks, include a flow-line configuration block, a header configuration block and a branch configuration block.

The present invention relates to a configurable block (forging) manifold system. Specifically the configurable manifold blocks includes a flow-line configuration block, a header configuration block and a branch configuration block.

BACKGROUND

Manifolds for hydrocarbon wells are used to join the flow of hydrocarbons from several wells, and include a number of inlets and an outlet. The number of inlets for the fluid flow will depend on the number of wells in the vicinity of the manifold. The manifold joins the fluid produced by the wells to one or more flows.

Such manifolds are in some cases also used for injecting fluids into the wells to increase reservoir pressure and to facilitate hydrocarbon production. The injecting fluid flows in the opposite direction of the fluid produced by the well. In this case, both a production manifold and a separate injection manifold are required. Alternatively, may one manifold be used for a combination of production and injection. In this case it is possible to use one header for production and one for injection (Dual header).

Fluid injection typically also include gas injection to provide gas lift to facilitate fluid flow.

Such manifolds are typically located subsea and are thus installed and operated using ROVs. Accordingly, the manifolds include connections for pipelines etc. that are adapted for ROV use. The valves and auxiliary equipment are then adapted for subsea use.

Regulations typically demand double cut off valves to accommodate double barrier philosophies for each well to provide a failsafe system with redundant valves to ensure that the flow from each well can be stopped individually. Double barrier philosophies are also implemented to avoiding leakage to sea through a none connected branch from a producing header reliably.

Manifolds are traditionally bespoke and adapted to specific requirements and includes a number of inlets and/or outlets adapted to the number of wells the manifold is designed to serve. Accordingly, suppliers make each manifold according to customer specifications, which leads to a certain production and assembly period. Each manifold design includes a high number of parts, and the requirement for several designs increases this number, making delivery times long and bespoke manifolds expensive.

A modular design built from standardized blocks, enables a stocking program which again will lead to a shorter delivery period as the main components are available and the production period is limited to the assembly of standard modules and elements.

SUMMARY

It is thus an object of the present invention to provide a manifold assembled of several, similar, standardized manifold configuration blocks.

Standardized manifold configuration blocks improve stocking possibilities and simplifies assembly and design of varying manifold configurations with different number of inlets and outlets. Another purpose is to provide a manifold system that is easy to adapt and that provides a platform catering for specific needs. The system focuses on flexibility with as few parts as practical.

The modular manifold of the invention assembled of standardized building blocks reduces the schedule with a pre-stocked strategy, where each module includes a module block may be in store at a forage master, ready to be heat treated according to client specifications. The pre-stocking reduces the schedule and reduces the risk in projects. An ingot of each manifold block can cover a header bore size in the range 8-16" and a service line bore size in the range from 2-6".

A longitudinal main bore may be uniform and have an internal diameter corresponding to the inner diameter of the flowline the manifold is designed to be connected to, to allow pigging of the flow line and is typically in the range from 8-16" and the transversal bore may have an internal diameter in the range from 5-8".

A single block raw shape can be stocked as a "green forging". A green forging is the forging before the block is heat treated.

In the following is the term "hydrocarbon well fluid manifold" intended to cover manifolds handling fluids in connection with wells producing hydrocarbon fluids. The expression is also intended to cover manifolds for injecting fluids into a hydrocarbon well even if the injected fluid not includes hydrocarbons. Furthermore may such wells also produce other fluids than hydrocarbons such as water.

Such hydrocarbon wells are typically located subsea on a seabed.

The present invention relates to a well fluid manifold header configuration block comprising a header configuration block housing having a plurality of transversal main bores each in fluid connection with a discrete longitudinal main bore. At least one cut off valve is located in each transversal main bore. A connection surface includes a fluid port for each transversal main bore adapted for coupling each transversal main bore to a hydrocarbon well. The longitudinal main bores extend through the header configuration block housing, forming a first flow port and a second flow port aligned with the first flow port for each longitudinal main bore. A first, plane, connecting surface surround each of the first flow ports. A second, plane, connecting surface surround each of the second flow ports. The first connecting surface is parallel to and similar with the second connecting surface, The flow ports of the longitudinal main bores are located symmetrically about an axis of symmetry, whereby the first connecting surface and the second connecting surface are adapted to be connected to at least one further similar header configuration block.

The housing may be formed as one unitary metal block, whereby the longitudinal main bores and the transversal bores terminating in the longitudinal main bore form T-shaped bores inside the unitary metal block.

The well fluid manifold header configuration block may further include connection bolt bores surrounding the longitudinal main bores.

The well fluid manifold header configuration block may include cut off valves in the transversal bores.

The well fluid manifold header configuration block may include header main bores being uniform and having an internal diameter in the range from 8-16» and the transversal main bores having an internal diameter in the range from 5-8".

Furthermore, the invention concerns a branch configuration block comprising a connector hub with at least one flow port, a well fluid header configuration block connecting surface with a plurality of flow ports facing away from the connector hub, and a plurality of fluid bores connecting the at least one flow port of the connector hub and the plurality of flow ports.

At least two of the plurality of fluid bores may join and form a single bore exiting the connector hub.

A branch isolation valve may be located in a single bore exiting the connector hub providing a double failsafe barrier.

The connector hub may include a service line port in addition to the at least one flow port of the connector hub.

The well fluid header configuration block connecting surface may be plane and may include sealing ring recesses and sealing rings surrounding each of the plurality of flow ports.

The connector hub may be adapted to hold a ROV-tool actuated clamp connector, connecting the branch configuration block and the header configuration block to a jumper from a well.

The branch configuration block may including a main monolithic metal housing, and the connector hub and the header configuration block connecting surface is then an integrated part of the housing.

Furthermore, the invention relates to a well fluid manifold assembled of a plurality of hydrocarbon header configuration blocks. The well fluid manifold includes at least a first and a second header configuration block, each comprising a header configuration block housing having a plurality of transversal bores terminating in a plurality of longitudinal main bores perpendicular to and in fluid connection with the transversal bores. At least one cut off valve is located in each transversal bore. A fluid port includes a connection adapted for coupling each transversal bore to a well. Each longitudinal main bore extend through the header configuration block housing and form a first flow port and a second flow port aligned with the first flow port. A first, plane, connecting surface surround the first flow ports. A second, plane, connecting surface surround the second flow ports. The first connecting surface is parallel to and similar with the second connecting surface. The first, plane, connecting surface of a first well header configuration block is in sealing contact with a first, plane, connecting surface of a second well header configuration block. A flowline configuration block is in sealing contact with a second, plane, connecting surface of the first header configuration block.

The plurality of hydrocarbon well fluid header configuration blocks may be identical and staggered.

The flowline configuration blocks may include a main bore sealing blanking surface.

DETAILED DESCRIPTION

Detailed description of embodiments of the invention with reference to the drawings:

Similar reference numerals refer to similar parts throughout this detailed description The figures show the same embodiment of a header configuration block of the invention, and the different figures are disclosed to show different aspects of this block.

Figure 3:
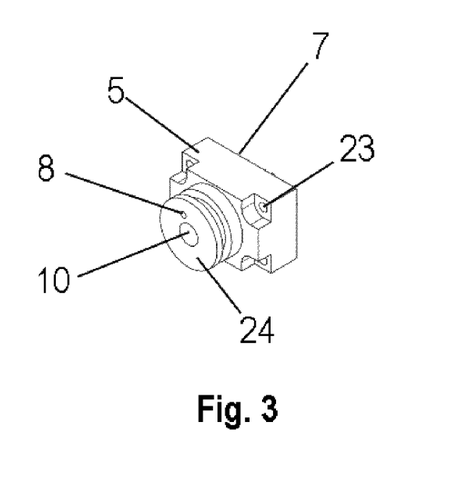
FIG. 3 is a perspective view of a first embodiment of a branch configuration block.
Figure 4:
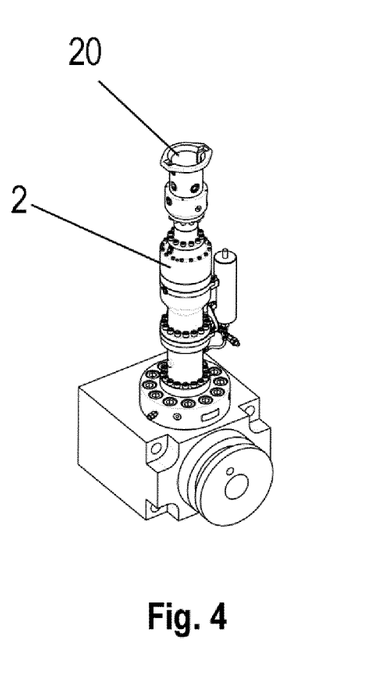
FIG. 4 is a perspective view of a second embodiment of a branch configuration block with a redundant cut-off valve.
Figure 5:
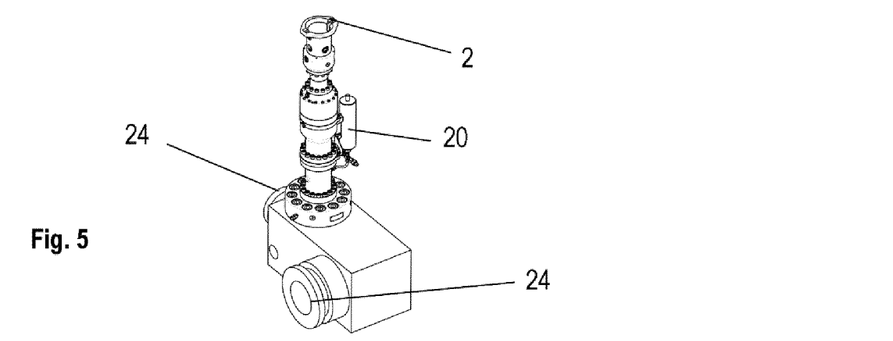
FIG. 5 is a perspective view of a first embodiment of a flowline configuration block.
Figure 6:
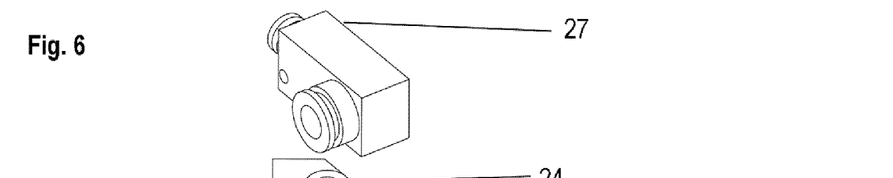
FIG. 6 is a perspective view of a second embodiment of a flowline configuration block.
Figures 7, 8:
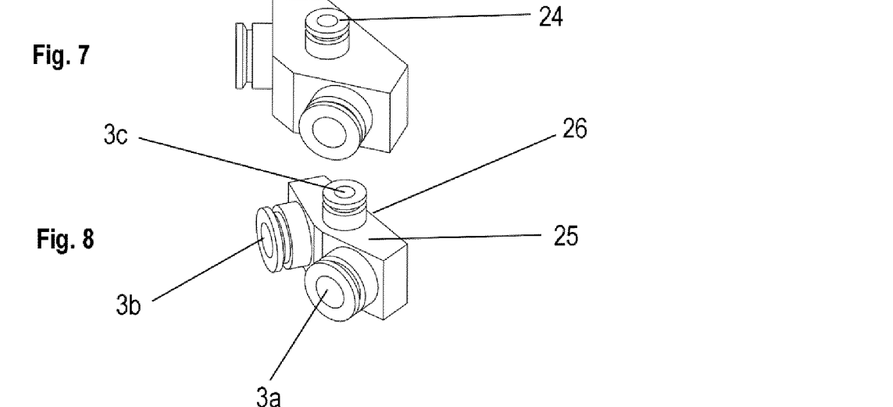
FIG. 7 is a perspective view of a third embodiment of a flowline configuration block.
FIG. 8 is a perspective view of a fourth embodiment of a flowline configuration block.

The figures show two embodiments of branch configuration blocks. One embodiment includes a separate cut-off valve to provide a double barrier if required. The other embodiment omits the additional cut-off valve. The configurable manifold blocks may include different internal ducting.

The figures show four embodiments of flowline configuration blocks. Two embodiment includes connection hubs for all the bores. A third embodiment includes a blinding portion forming a permanent barrier for one of the bores. A fourth embodiment includes both a blinding portion forming a permanent barrier for one of the bores and a cut-off valve for a service line.

Figure 1:
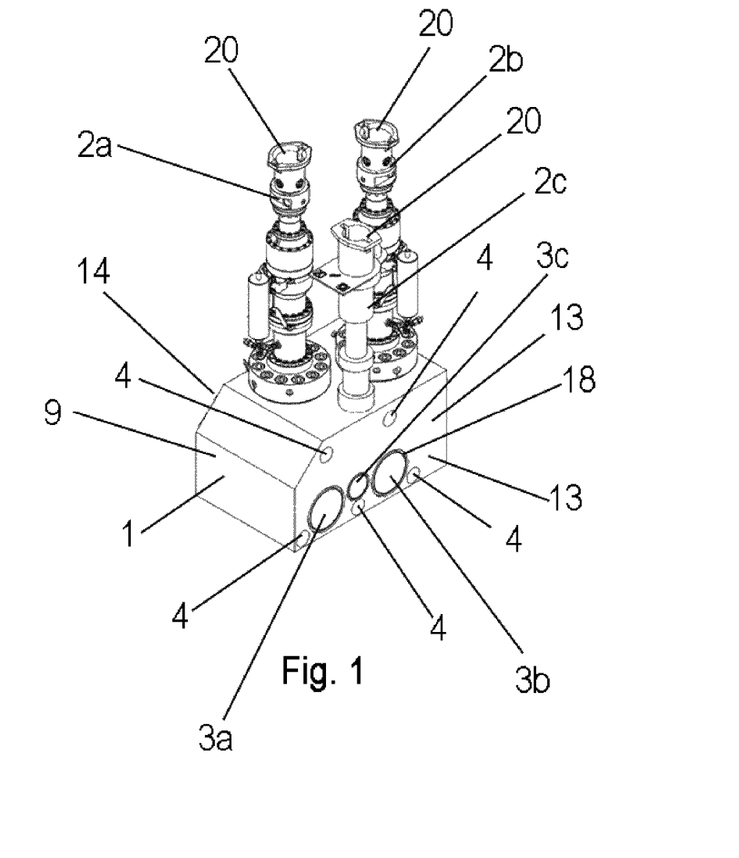
FIG. 1 is a perspective view of a header configuration block of the invention.
Figure 2:
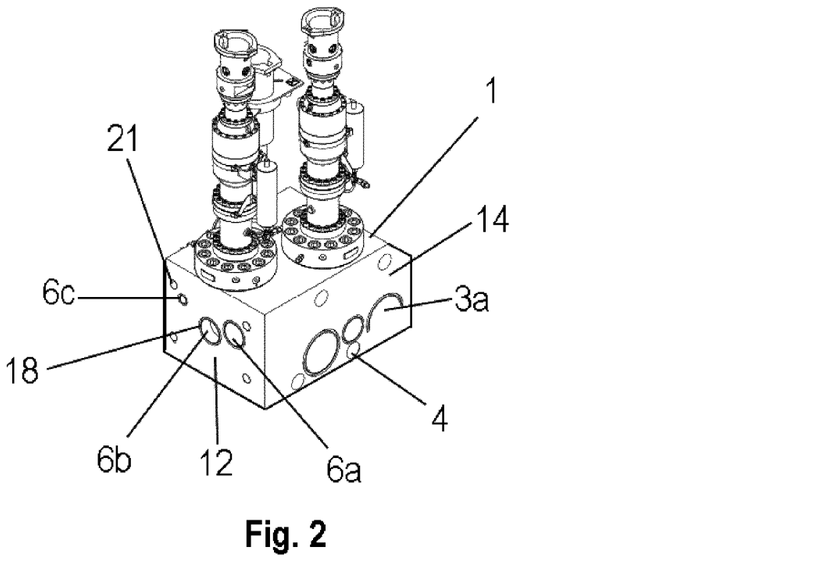
FIG. 2 is a perspective view of the header configuration block of FIG. 1 from another side.

FIG. 1 and FIG. 2 are perspective views of a header configuration block 1 of the invention from two different angels. The header configuration block has branch of isolation valves and is configured to one or more headers (shown with 3). The branch configuration block and header configuration block are bolted together. The blocks can then be stacked together as a 1-slot, 2-slot, 3-slot, 4-slot manifold or more.

The header configuration block 1 is formed as a header configuration block housing 9 forming a standard block with standardised dimensions and connections, enabling the assembly of a modular system. The header configuration block housing 9 is formed as a rectangular block (with one bevelled side) with right angled sides and includes a header first main bore 3a being a longitudinal first main bore, a header second main bore 3b being a longitudinal second main bore and a header main service bore 3c being a longitudinal service bore. A header first branch bore or transversal main bore 6a first cut off valve 2a, a header second branch bore or second transversal main bore 6b second cut off valve 2b, and a header service branch bore 6c cut off valve 2c are located on top of the configuration block housing 9. A tool connector/torque tool bucket 20 on each valve includes a connection for a tool on an ROV to actuate each valve independently. The valves are typically gate valves. The header configuration block housing 9 includes five module connection holes 4 for installation of suitable bolts or other mechanical fasteners to connect the header configuration block to other similar header configuration blocks or to a flowline configuration block.

The header first main bore 3a, the header second main bore 3b and the header service bore 3c form ports at each side of the header configuration block housing 9. The ports are surrounded by metal seals in recesses 18, and are located symmetrically about an axis of symmetry allowing the ports to align with ports of a similar housing at both sides. The symmetrical configuration enables two identical header configuration blocks to the assembled in opposite directions or staggered with branch configuration block connecting surfaces 12 in opposite directions. The header configuration blocks may be arranged alternating, each providing bore openings to opposite sides of the final manifold block assembly. This alternating or staggered arrangement ensure sufficient space between the hubs arranged on header configuration blocks having the same direction i related to the manifold block assembly.

One cut off valve 2a-2c for each main branch bore 6a-6b or service bore 6c, provides a single barrier system without any redundant valve and torque tool bucket assemblies. The header configuration block housing 9 includes a branch port for each of a header first main branch bore 6a, a header second main branch bore 6b and a header service branch bore 6c, also surrounded by a metal seal in a recess 18 for each bore.

A branch configuration block connecting surface 12 is plane and surrounds the branch ports. Four branch configuration block connection holes 21 are provided to facilitate attachment of the branch configuration block.

FIGS. 3 and 4 are perspective views of a branch configuration block 5 of two embodiments of the invention.

A branch configuration block distributes the production and includes a services line. A branch jumper connection hub is an integrated part of the branch block. A service line can either be connected in to the production flow or be routed to a dual jumper via the dual hub to a XT.

The branch configuration block includes a header connecting surface 7 with ports corresponding to the ports for the header first main branch bore 6a, the header second main branch bore 6b and the header service branch bore 6c. The header connecting surface 7 conforms with the branch configuration block connecting surface 12 of the header configuration block. Four header connection holes 23, one at each corner, conforming to the four branch configuration block connection holes 21 are included for attachment purposes in combination with mechanical fasteners. A connection hub 24 for a branch jumper provides a means of attachment to a clamp connector. The connection hub 24 includes both a port for a service line connection 8 and a port for a production line jumper connection 10. The branch jumper connection hub is an integrated part of the branch block. The port for a production line connection 10 leads to a branch to provide bores to the header first main branch bore 6a, and the header second main branch bore 6b. The branch configuration block 5 is formed as one single block of metal. In FIG. 4, the branch configuration block 5 also includes a cut-off valve with a valve stem extension and a tool connector 20 provided as a torque tool bucket to provide a double barrier when a double barrier, redundant system is required.

FIGS. 5-8 show different embodiments of flowline configuration blocks 25 with connection hubs 24 for connection to the header main bores 3a, 3b, and the header service bore 3c. The flow-line configuration block is connected to each end of the branches/header to host the flow-line connection. The hub connections are integrated parts of the flow line configuration block. The flow line block can be equipped with header valves, or the header valves can be connected between the flow line block and the flow line connection.

The flowline configuration blocks 25 include a header configuration connecting surface 26 with ports aligning with the ports of the header connecting surface. The embodiments on FIGS. 5 and 6 also include a blanking surface 27 sealing off the header main bores at one end.

Figure 9:
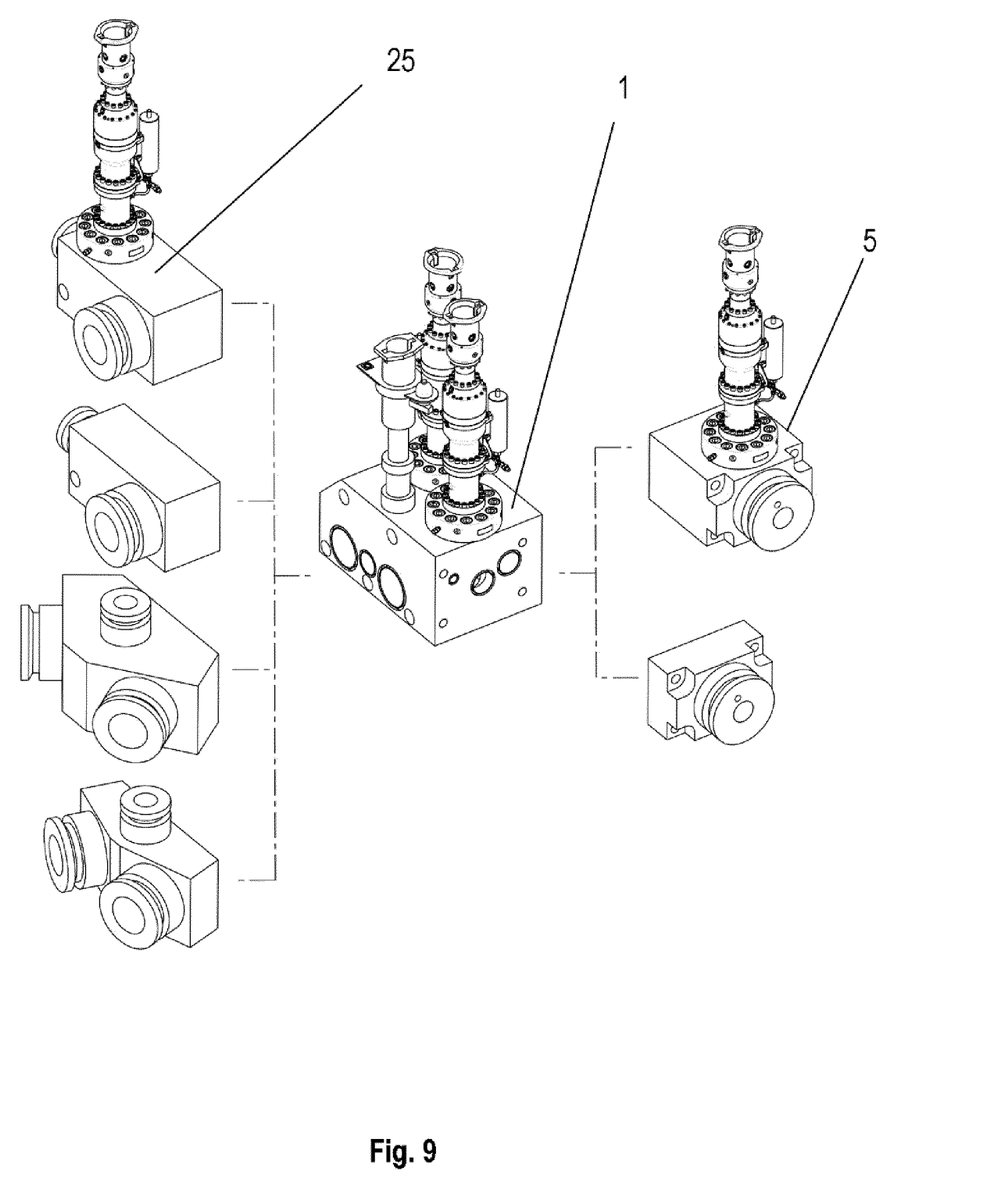
FIG. 9 is a perspective view of all the building blocks forming a manifold.

FIG. 9 shows all the building blocks of a manifold of the invention including all the shown embodiments. Four different flowline configuration blocks 25, one header configuration block 1 and two embodiments of branch configuration blocks are shown.

Figure 11:
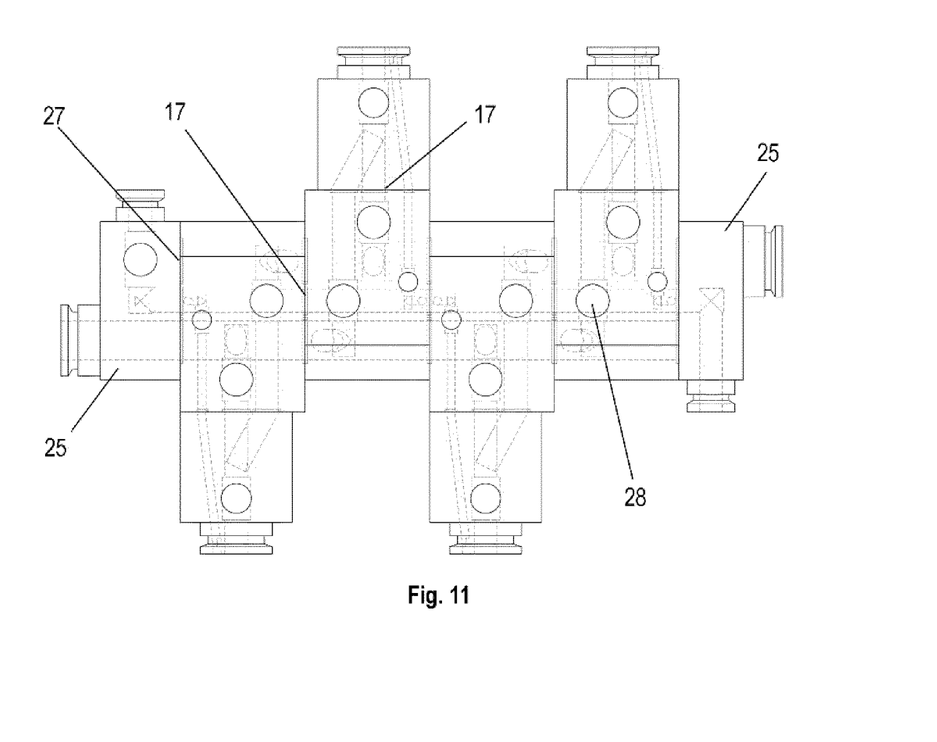
FIG. 11 is a top elevation of a manifold assembled of the building blocks of the invention in a second configuration including dotted lines indicating internal bores with staggered header configuration blocks facing in opposite directions.
Figure 12:
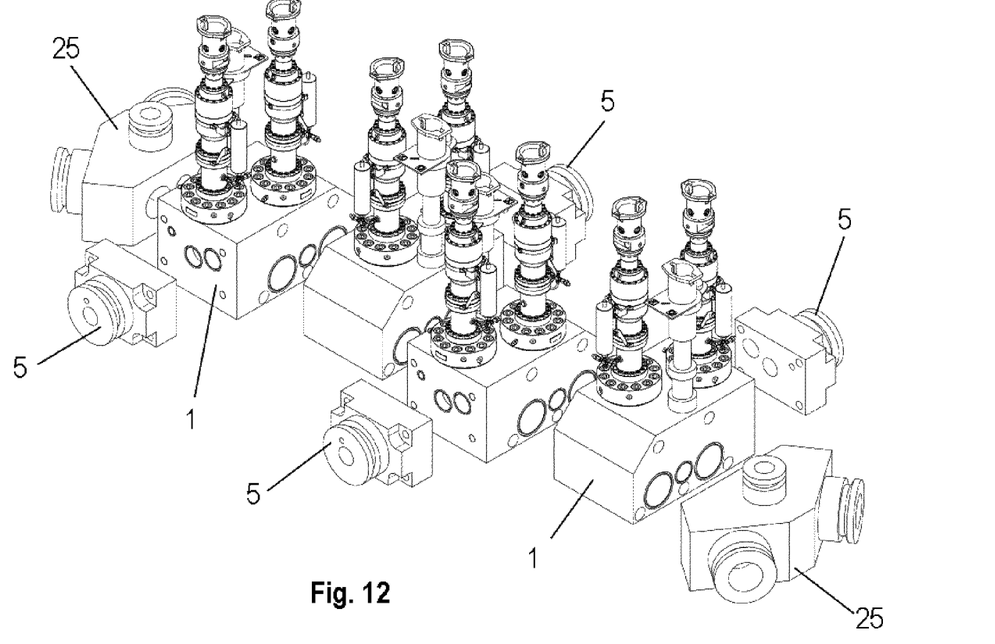
FIG. 12 is an exploded view of the manifold of FIG. 10.
Figure 13:
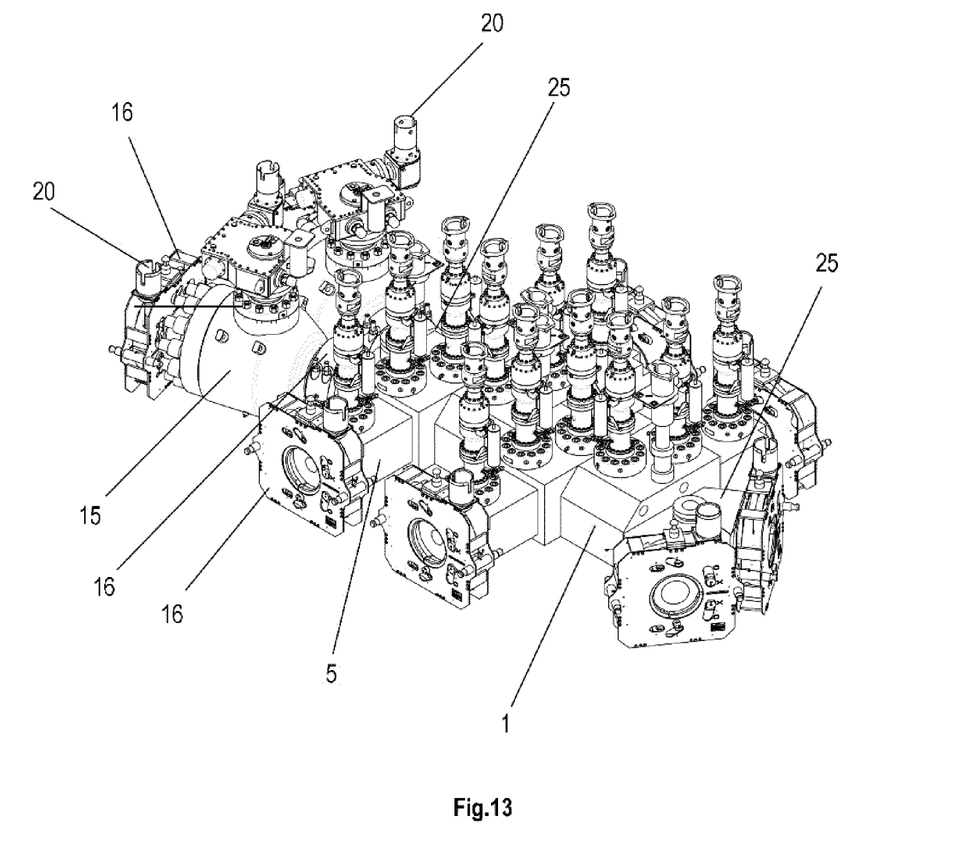
FIG. 13 is a perspective view of an assembled manifold with header isolation valves and clamp connectors.

The FIGS. 10-13 show a manifold with four staggered or alternately facing header configuration blocks 1. FIG. 13 clearly shows how this staggered positioning of the facing header configuration blocks 1 provides room for, for instance clamp connectors 16.

Figure 10:
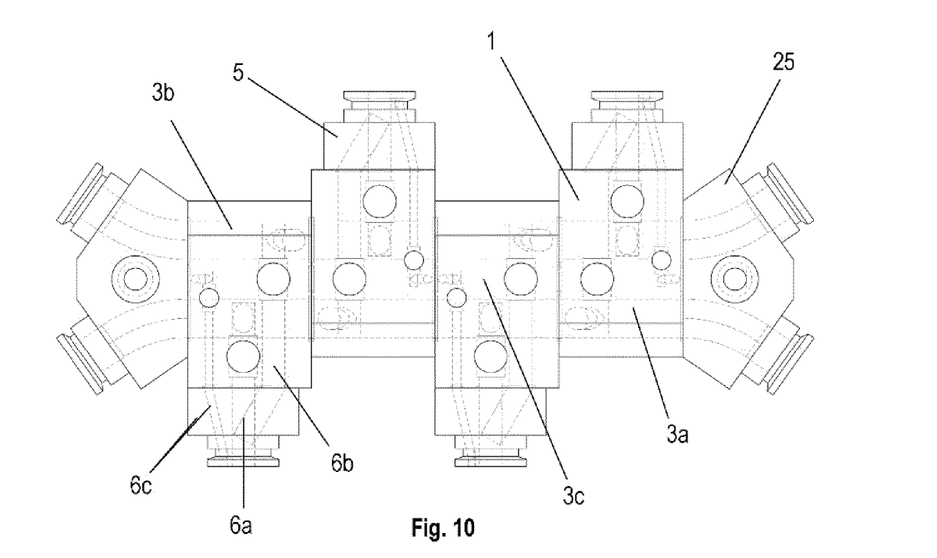
FIG. 10 is a top elevation of a manifold assembled of the building blocks of the invention in a first configuration, including dotted lines indicating internal bores and staggered header configuration blocks facing in opposite directions.

FIGS. 10 and 11 show two manifolds with slightly different configurations. The internal main bores 3a-3c, 6a-6c, are shown in dotted lines. The two embodiments of branch configuration blocks 5 are shown, one for a double barrier with a redundant cut-off valve in FIG. 11 and the other without the additional cut-off valve in FIG. 10. The internal branch bores 6a-6c of the branch configuration blocks 5 and the header configuration blocks 1 communicate with their respective header main bores and the header service bore. The internal bores of the flowline configuration blocks 25 also communicate with the header main bores and the header service bore 3a-3c. The flowline configuration blocks 25 of FIG. 11 also includes a blanking surface 27, sealing off one end of the header bores.

FIG. 10 shows four similar header configuration blocks 1 of the invention assembled to a manifold. The first and second connecting surfaces of each header configuration block 1 are connected to connecting surfaces of adjoining modules and form module interfaces 17 sealed with metal seals. The two main header bores of each of the four header configuration blocks 1 form two straight bores with uniform diameter along the bores. Sealing module interfaces 17 are formed between the various modules.

A flowline configuration block 25 is attached to each of the two header bore ends.

The alternate positioning of the header configuration blocks face in opposite directions and away from each other provide room for the connections.

In FIG. 11, the flowline configuration blocks 25 shown on FIG. 4 includes the blanking surface sealing the header bore, serving as a termination element.

The manifold can be used both in an injection manifold and a production manifold, and the ports have therefore not been defined as inlet ports or outlet ports. In a production manifold, will however the branch port be an inlet port, and the produced fluid will exit through a header port. In an injection manifold, will however the branch port be an exit port.

The header configuration block housings 9 include isolation valve cavities 28 for the isolation valves. The isolation valves are included to enable isolation of each hydrocarbon well connected to the manifold individually. The branch bores 6a-6c extends from the branch port, past the valve cavities 8 and into the header bores 3a-3c. The branch bores 6a-6c and the header bores 3a-3c form a T. The branch connection hub is formed in the extension of the branch bores 6a-6c. The housing is a one-piece housing formed as a unitary solid steel block that will be heat treated according to required specifications.

FIGS. 10 and 11 show four similar header configuration blocks 1 of the invention assembled to a manifold. The header bores 3a-3c of each of the four header configuration blocks 1 form three straight bores with uniform diameter along the bores, and are shown in dotted lines.

The longitudinal main bore/header main bore typically has an internal diameter in the range from 8-16» and the transversal bore/branch holes have an internal diameter in the range from 5-8". The header main bore typically has a diameter corresponding to the inner diameter of a flowline to be connected to the manifold to allow pigging.

FIG. 12 is an exploded view of the embodiment shown in FIG. 10 further highlighting four header configuration blocks 1, branch configuration blocks 5 and flowline connection blocks 25 at each end configured to form a complete manifold.

FIG. 13 shows four similar header configuration blocks 1, each with a branch configuration block 5 of the invention assembled to a manifold. A clamp connector 16 is installed on each connection hub. Two header isolation valves 15 are installed on one of the two flowline configuration blocks 25. A tool connector/torque tool bucket 20 on each valve, including on the header isolation valves and on each clamp connector 16, includes a connection for a tool on a ROV to actuate each valve independently. Each a branch configuration block 5 is typically connected to a x-mas tree through a jumper and one flowline connection block is typically connected to flowlines. The header isolation valves 15 can block off the manifold at one end until the manifold is connected to another manifold or to a loop, connecting the two ports of the branch configuration block 16, allowing pigging of the flowline.

Alternatively could the valves include independent or common, permanently installed powered actuators.

Throughout this specification are the header configuration blocks 1 shown with three bores. The header configuration blocks could however be made with more than three bores and up to six bores seem realistic. More than six bores will make the modules unpractically large, and it will might be cumbersome and tight to fit a high number of valves. The branch configuration blocks will have a corresponding number of bores.

| | |
|---|---|
| 1 | Header configuration block/Manifold module |
| 2 | Isolation valve stem extension |
| 2a | Header first branch bore valve |
| 2b | Header second branch bore valve |
| 2c | Header service branch bore valve |
| 3a | Header first main bore/main first longitudinal main bore |
| 3b | Header second main bore/main second longitudinal main bore |
| 3c | Header main service bore/longitudinal service bore |
| 4 | Module connection hole |
| 5 | Branch configuration block |
| 6a | Header first main branch bore/first transversal bore |
| 6b | Header second main branch bore/second transversal bore |
| 6c | Header service branch bore/transversal service bore |
| 7 | Header connecting surface |
| 8 | Service line connection in a dual bore configuration |
| 9 | Header configuration block housing |
| 10 | Production line connection in a dual bore configuration |
| 12 | Branch configuration block connecting surface |
| 13 | First connecting surface |
| 14 | Second connecting surface |
| 15 | Header isolation valve |
| 16 | Clamp connector |
| 17 | Module interface |
| 18 | Metal seal in metal seal recess |
| 20 | Tool connector |
| 21 | Branch configuration block connection holes |
| 23 | Header connection holes. |
| 24 | Connection hub |
| 25 | Flowline configuration block |
| 27 | Blanking surface |
| 28 | Isolation valve cavities |

The invention claimed is:

1. A manifold header configuration block comprising a manifold header configuration block housing having a plurality of transversal main bores each terminating in a discrete longitudinal main bore substantially perpendicular to and in fluid connection with the transversal main bores;
at least one cut off valve in each transversal main bore;
a connection surface with fluid ports for the transversal main bores adapted for coupling the transversal main bores to a well;
wherein the longitudinal main bores extend through the manifold header configuration block housing, forming a first flow port and a second flow port aligned with the first flow port for each longitudinal main bore;
a first, plane, connecting surface surrounding the first flow ports;
a second, plane, connecting surface surrounding the second flow ports; wherein the first connecting surface is parallel to and similar with the second connecting surface, and wherein the flow ports of the longitudinal main bores are located symmetrically about an axis of symmetry, whereby the first connecting surface and the second connecting surface are adapted to be connected to at least one further similar manifold header configuration block; and
a flowline configuration block in sealing contact with a second, plane, connecting surface of the first manifold header configuration block.

2. The manifold header configuration block of claim 1, wherein the housing is formed as one unitary metal block, whereby the longitudinal main bores and the transversal main bores terminating in the longitudinal main bore form T-shaped bores inside the unitary metal block.

3. The manifold header configuration block of claim 1 further including connection bolt bores surrounding the longitudinal main bores.

4. The manifold header configuration block of claim 1 including cut off valves in the transversal main bores.

5. The manifold header configuration block of claim 1 wherein the header longitudinal main bores are uniform and have an internal diameter in the range from 8-16" and the transversal main bores have an internal diameter in the range from 5-8".

6. The manifold header configuration block of claim 1, further comprising:
a branch configuration block with a connector hub with at least one flow port with a connection adapted for coupling the transversal bores to a well.

7. The manifold header configuration block of claim 6, wherein the branch configuration block is incorporated into the header configuration block.

8. A hydrocarbon well fluid manifold assembled of a plurality of manifold header configuration blocks, including at least a first and a second manifold header configuration block, each comprising
- a header configuration block housing having a plurality of transversal bores including transversal main bores and at least one each terminating in a discrete longitudinal bore perpendicular to and in fluid connection with the transversal bores;
- at least one cut off valve in each transversal bore;
- a branch configuration block with a connector hub with at least one flow port with a connection adapted for coupling the transversal bores to a well, a manifold header configuration block connecting surface, and a plurality of fluid bores connecting the at least one flow port of the connector hub and the plurality of fluid ports of the transversal bores;
- wherein each longitudinal bore extending through the header configuration block housing form a first flow port and a second flow port aligned with the first flow port;
- a first, plane, connecting surface surrounding the first flow ports;
- a second, plane, connecting surface surrounding the second flow ports;
- wherein the first connecting surface is parallel to and similar with the second connecting surface, and wherein the flow ports of the longitudinal bores are located symmetrically about an axis of symmetry;
- wherein the first, plane, connecting surface of at least the first manifold header configuration block is in sealing contact with the first, plane, connecting surface of the second manifold header configuration block; and
- wherein a flowline configuration block is in sealing contact with a second, plane, connecting surface of the first manifold header configuration block.

9. The hydrocarbon well fluid manifold of claim 8, wherein the plurality of hydrocarbon manifold header configuration blocks are identical and staggered.

10. The hydrocarbon well fluid manifold of claim 8, wherein flowline configuration block includes a main bore sealing blanking surface.

\* \* \* \* \*